No. 831,350. PATENTED SEPT. 18, 1906.
H. JACOB.
TELESCOPE WITH REFRACTED OPTICAL AXIS.
APPLICATION FILED MAY 23, 1905.

2 SHEETS—SHEET 1.

WITNESSES:
A. L. O'Brien
Herman Morris

Inventor:
HEINRICH JACOB
by
Dickerson, Brown, Raegener & Binney
att'ys

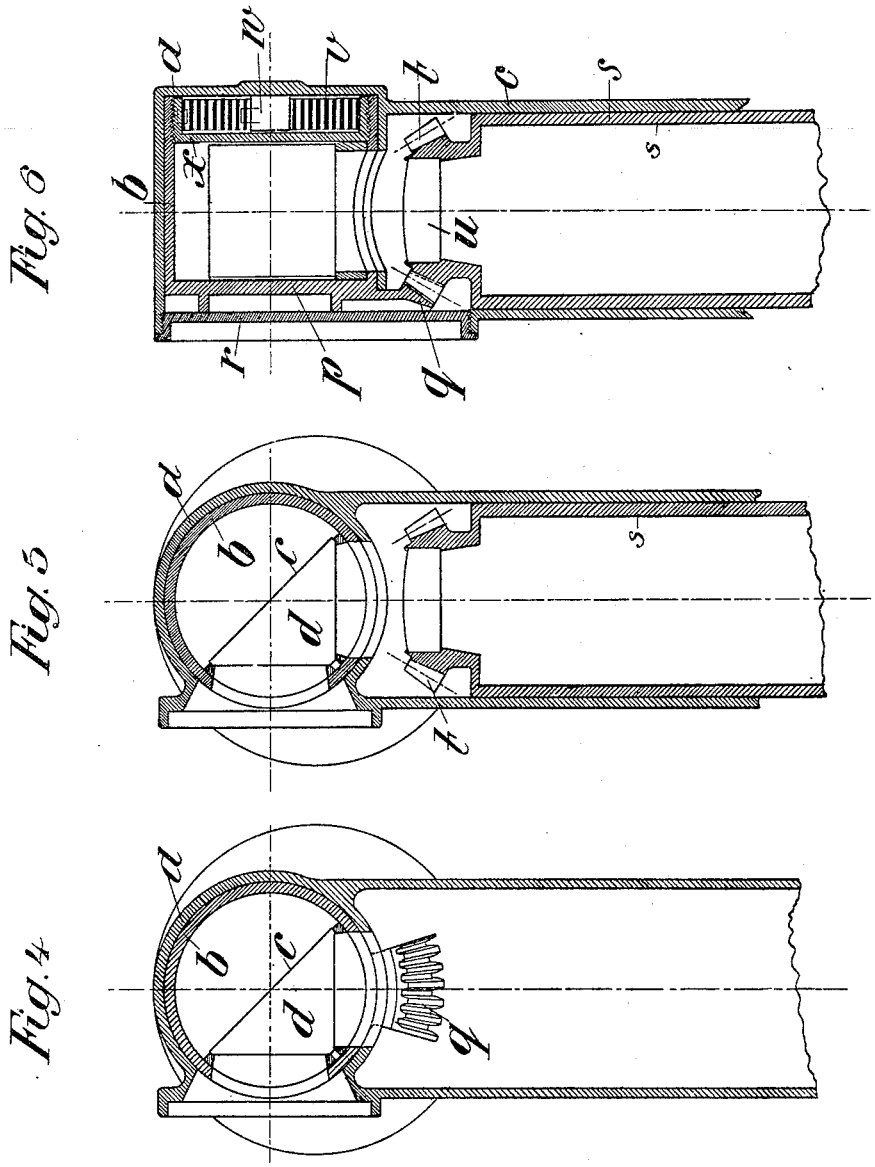

UNITED STATES PATENT OFFICE.

HEINRICH JACOB, OF FRIEDENAU, GERMANY, ASSIGNOR TO FIRM OF OPTISCHE ANSTALT C. P. GOERZ AKTIENGESELLSCHAFT, OF FRIEDENAU, NEAR BERLIN, GERMANY.

TELESCOPE WITH REFRACTED OPTICAL AXIS.

No. 831,350.     Specification of Letters Patent.     Patented Sept. 18, 1906.

Application filed May 23, 1905. Serial No. 261,843.

*To all whom it may concern:*

Be it known that I, HEINRICH JACOB, engineer, a citizen of the German Empire, and a resident of Friedenau, near Berlin, Germany, have invented certain new and useful Improvements in Telescopes with Refracted Optical Axes, of which the following is a specification.

This invention relates to a telescope which has a reflector or a combination of reflectors inserted in the path of the rays and inclined to same in such a manner that the rays coming from an object within the field of view of the instrument are reflected in a direction depending upon the arrangement of the reflector or reflectors used. In instruments of such kind, especially if used as pointing instruments on guns, &c., it is desirable to bring objects of different elevation into the field of view. At the same time care must be taken that the reflector or combination of reflectors receiving the rays sent by the object to be sighted is not affected by shocks meeting the instrument. In order to secure these effects, the reflector or combination of reflectors is mounted in a casing having a cylindrical outer wall and being rotatably mounted in the hollow of a second casing with a cylindrical inner wall, serving as a bearing for such reflector-carrying casing. This arrangement results in a large bearing-surface, which diminishes the influence of shocks on the reflector and prevents at the same time every deformation of the elements of the bearing, such as warping of the axle of rotation, &c.

The invention is illustrated in the accompanying drawings.

Figure 3:
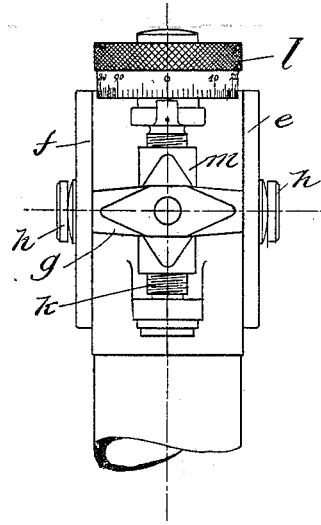
Figure 1:
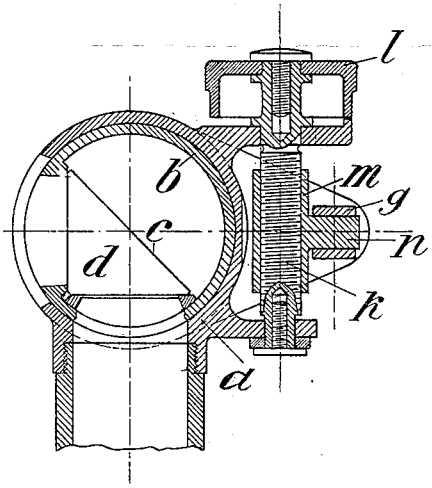
Figure 2:
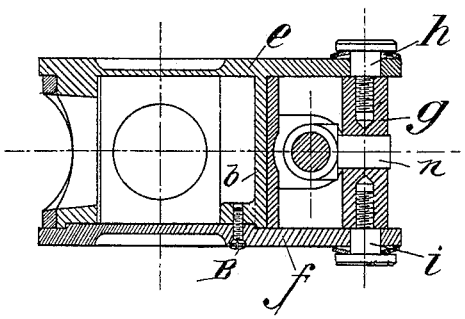

Figures 1 to 3 show one embodiment of the new reflector arrangement, the telescope itself being broken away. Fig. 1 is a section perpendicular to the axis of rotation of the reflector. Fig. 2 is an axial section through the device. Fig. 3 is a side elevation. The modification represented in Figs. 4 to 6 is shown in Fig. 4 in a section perpendicular to the axis of rotation of the reflector, the actuating member for the reflector-casing being omitted. Fig. 5 is a section similar to the section of Fig. 4 looking toward the side opposite that of Fig. 3. Fig. 6 is a section parallel to the axis of rotation of the reflector.

Referring more particularly to Figs. 1 to 3, $a$ designates a casing forming a bearing for the reflector-support. Rotatably mounted within this casing is a cylindrical carrier or support $b$ for a prism $d$, with reflecting-surface $c$. The cylinder $b$, bearing on the inner cylindrical surface of the casing $a$, is provided on one end with the face-plate $e$, preferably made integral therewith, and on the other end with the face-plate $f$, which is preferably detached and secured to the cylinder $b$ by means of the screw B. The side plates $e$ and $f$ are connected with each other by a pin $g$ and screws $h$ $i$, rotatably inserted in said plates $e f$ and screwed into holes of said pin $g$. The casing $a$ is provided with bearings for an adjusting-screw $k$, with hand-wheel $l$, said adjusting-screw $k$ working in a nut $m$, with pin $n$ inserted in a hole of pin $g$.

The operation of the device is as follows: By rotating the hand-wheel $l$ nut $m$ is screwed up or down on screw $k$, communicating its movement by pins $n$ and $g$ to the face-plates $e f$ of the reflector-support $b$. From this appears that a rotation of the hand-wheel $l$ results in a rotation of the reflector-support $b$ and reflector $c$ within the cylindrical bore of casing $a$.

In the modification shown in Figs. 4 to 6 the casing forming a bearing for the reflector-support is again designated $a$ and the reflector-support $b$. The casing $a$ forms a head-piece of a tube $o$. The reflector $c$ is a reflecting-plane of the prism $d$, as in the former instance. $p$ is a face-plate of the prism-support $b$. This face-plate has an extension at its lower end forming a toothed segment $q$. $r$ is a cap closing the casing $a$. Rotatably mounted within the tube $o$ is a tube $s$, provided at its upper end with a toothed edge $t$, meshing with the segment $q$. This tube carries at its upper end the objective $u$ of the instrument. $v$ is a spiral spring connected with one end to a pin $w$, forming a part of the casing $a$, and with the other end to a cap $x$, screwed into the hollow of the prism-support $b$. The operation of this modification is as follows: If it is desired to alter the elevation of the instrument, the tube $s$ is rotated by any suitable means. (Not shown on the drawings.) This rotation is communicated to the segment $q$ and to the prism-support $b$. The spiral spring $v$ secures permanent contact between the teeth $t$ of the tube $s$ and the teeth of the segment $q$.

Having now particularly described and ascertained the nature of the invention and in what manner the same is to be performed, I declare that what I claim is—

In a telescope, the combination with at least one reflector inserted in the path of the rays and inclined to its axis, a cylindrical casing forming a support for at least one reflector, a second cylindrical casing forming a bearing for the first-named casing, and means to rotate the casing of the reflector-support, upon the bearing formed between the inner and outer casing about a horizontal axis.

In testimony whereof I have signed this specification in the presence of two subscribing witnesses.

HEINRICH JACOB.

Witnesses:
 HENRY HASPER,
 WOLDEMAR HAUPT.